(12) United States Patent
Johnson

(10) Patent No.: US 6,206,798 B1
(45) Date of Patent: Mar. 27, 2001

(54) ACTIVE DIFFERENTIAL

(75) Inventor: Michael E. Johnson, Rochester, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/390,162

(22) Filed: Sep. 3, 1999

(51) Int. Cl.$^7$ ............................... F16H 3/72; F16H 37/06
(52) U.S. Cl. ................................... 475/6; 475/28
(58) Field of Search .................................. 475/6, 28

(56) References Cited

U.S. PATENT DOCUMENTS

| | | | |
|---|---|---|---|
| 2,408,507 | * 10/1946 | Brown | 475/28 |
| 3,450,218 | * 6/1969 | Looker | 475/28 |
| 3,530,741 | * 9/1970 | Charest | 475/28 |
| 4,109,551 | 8/1978 | Nemec | 74/705 |
| 4,495,836 | 1/1985 | Cohen | 74/751 |
| 4,760,758 | 8/1988 | Murayama | 74/764 |
| 4,776,235 | 10/1988 | Gleasman et al. | 74/720.5 |
| 4,848,186 | * 7/1989 | Dorgan et al. | 475/28 |
| 5,168,946 | * 12/1992 | Dorgan | 475/6 |
| 5,415,595 | 5/1995 | Nelson | 475/7 |
| 5,685,798 | 11/1997 | Lutz et al. | 475/331 |

* cited by examiner

Primary Examiner—Dirk Wright
(74) Attorney, Agent, or Firm—Carlson, Gaskey & Olds

(57) ABSTRACT

A differential apparatus for controlling the wheel speed of a vehicle includes a primary driving input, and first and second output shafts. The differential apparatus also includes a first planetary gear system in driving engagement with the first output shaft for rotating the first output shaft, and a second planetary gear system in driving engagement with the second output shaft for rotating the second output shaft. At least one auxiliary input mechanism selectively drives the first and second planetary gear systems for rotation in opposite directions to effect different rotational speeds to the first and second output shafts, thereby controlling the wheel speed of the vehicle.

19 Claims, 3 Drawing Sheets

ACTIVE DIFFERENTIAL

BACKGROUND OF THE INVENTION

The subject invention relates to a differential apparatus including an auxiliary input mechanism to control the wheel speed of a vehicle.

Conventional differential apparatuses for controlling the wheel speed of a vehicle are known in the art. Generally, a differential apparatus transmits a driving force from a vehicle engine to an output shaft or shafts of the vehicle. Ultimately this driving force is transmitted to the vehicle wheels, which are associated with the output shafts of the vehicle. The operating performance of the vehicle wheels is dependant on the amount of torque available at the wheels. Conventional differentials typically include an exclusive input for controlling the wheel speed of the vehicle. That is, the driving force from the vehicle engine is typically transmitted by a single pinion gear that is mounted to a drive shaft of the vehicle. The pinion gear operates as the exclusive input to the conventional differential apparatus.

As a result of this exclusive input, when such conventional differentials are applied particularly to a heavy vehicle having wheels or to a track-driven vehicle the amount of torque available at the wheels is affected. More specifically, if a wheel on a first side of the differential slips due to poor traction conditions, the torque available at a wheel on the other side of the differential can be no more than the torque that is developed at the wheel on the first side that is slipping due to the poor traction conditions. This is true regardless of the traction conditions at the wheel on the other side of the differential. That is, the torque that is developed at the wheel on the other side of the differential can be no more than the torque that is developed at the wheel on the first side even if satisfactory traction conditions are present at the wheel on the other side of the differential.

Furthermore, such conventional differential apparatuses limit the effectiveness of the vehicle because the output shafts are restricted to rotation in the same direction. As a result, it is not possible for the vehicle to pivot about a stationary position. That is, the vehicle cannot turn without progressing forward or backward to some degree. Pivoting about a stationary position is a critical and therefore desirable characteristic in the heavy vehicle or track-driven vehicle industries where these vehicles are frequently required to function in confined spaces.

All of these problems became particularly acute in differentials that utilize planetary transmissions.

Due to the inefficiencies identified in conventional differential apparatuses, it is desirable to implement a differential apparatus that incorporates an auxiliary input mechanism that enables different rotational speeds and different rotational directions of the output shafts of a vehicle to more effectively control the wheel speed and traction of a vehicle.

SUMMARY OF THE INVENTION AND ADVANTAGES

A differential apparatus for controlling the wheel speed of a vehicle comprises a primary driving input, and first and second output shafts. A first planetary gear system is in driving engagement for rotating the first output shaft. Similarly, a second planetary gear system is in driving engagement for rotating the second output shaft. Further, the first planetary gear system includes a first ring gear, and the second planetary gear system includes a second ring gear. The apparatus also includes at least one auxiliary input mechanism in selective driving engagement with the first and second planetary gear systems for rotating the first and second ring gears in opposite directions to effect different rotational speeds to the first and second output shafts.

By selectively driving the ring gears of each planetary gear system in opposite directions, the auxiliary input mechanism ultimately effects different rotational speeds to the vehicle wheels. As a result, various operational capabilities of the vehicle, including steering and traction capabilities, are not diminished but are enhanced during turning of the vehicle. Further, by selectively driving the ring gears of the planetary gear systems in opposite directions, the rotational direction of one output shaft may be different from the rotational direction of the other output shaft, and it is possible for the vehicle to pivot about a stationary position without the vehicle progressing forward or backward—a characteristic that is desirable when operating the vehicle such as a fork lift, in confined spaces.

Accordingly, the subject invention provides a differential apparatus that incorporates an auxiliary input mechanism that enables different rotational speeds and different rotational directions of the output shafts of a vehicle to more effectively control the wheel speed of a vehicle and to provide maximum torque to each wheel regardless of traction conditions. Consequently, the differential apparatus of the subject invention enhances the operational capabilities of the vehicle, including steering and tractional capabilities.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
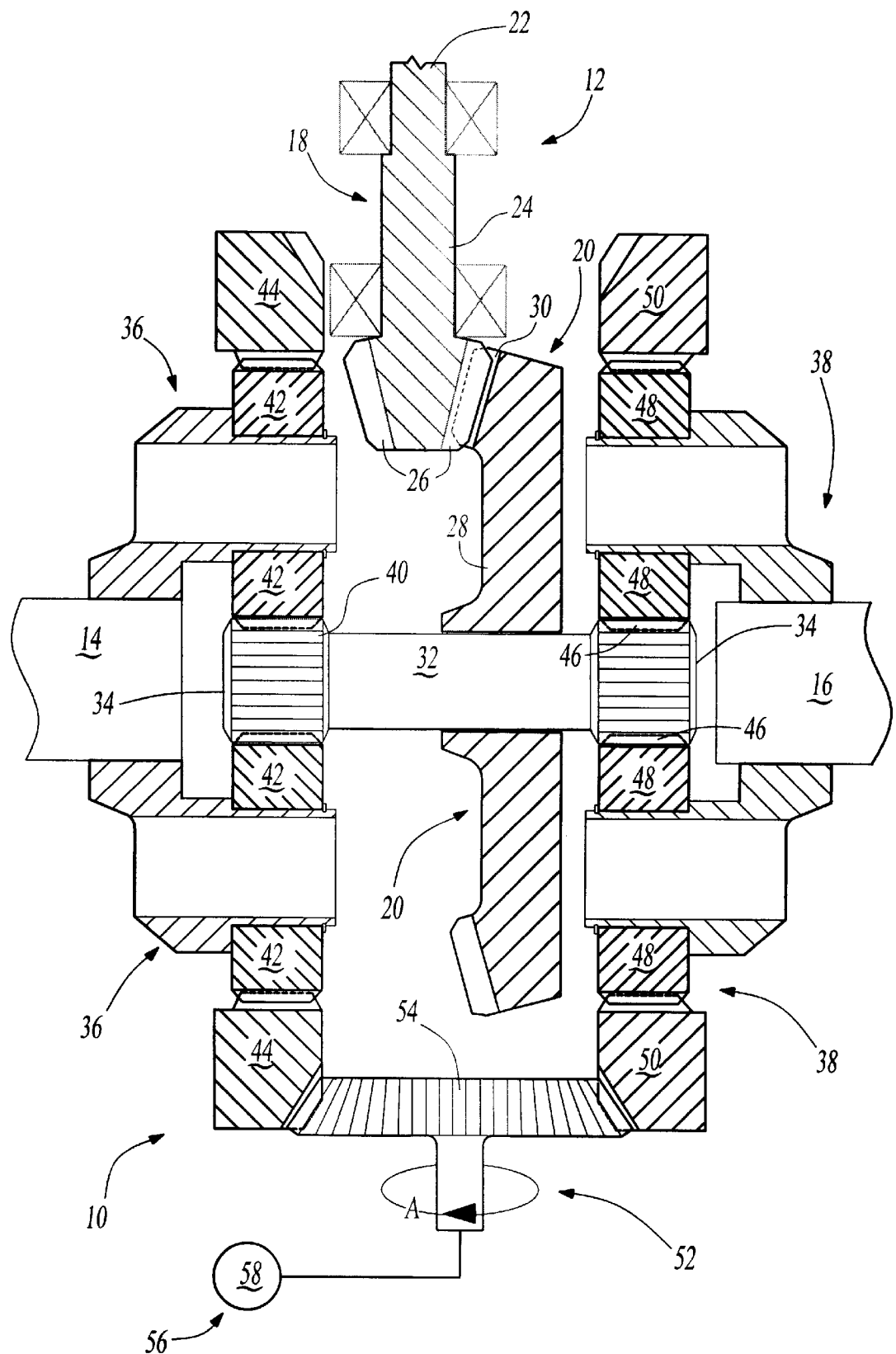
FIG. 1 is a detailed partially cross-sectional top view showing in particular an auxiliary input mechanism in the overall environment of a differential apparatus.

FIG. 1 shows a differential apparatus 10, with a primary driving input 12 and first 14 and second 16 output shafts. The primary driving input 12 of the subject invention includes a first bevel gear 18 and a second bevel gear 20. The first bevel gear 18 is mounted to a drive shaft 22 of the vehicle and is adapted to be driven in response to the drive shaft 22. Although not shown in the Figures, the drive shaft 22 is driven by an engine of the vehicle. The first bevel gear 18 is in meshing engagement with the second bevel gear 20 for rotatably driving the first 14 and second 16 output shafts. Preferably, the first bevel gear 18 is a pinion gear 24, and the pinion gear 24 includes teeth 26 mechanically engaged to the second bevel gear 20. Also, the second bevel gear 20 is preferably a ring gear 28 having teeth 30 in complimentary mechanically engagement with the teeth 26 of the pinion gear 24. The primary driving input 12 further includes an intermediate output shaft 32 having distal ends 34. The intermediate output shaft 32 is disposed between the first 14 and second 16 output shafts and is driven by the second bevel gear 20. Therefore, in the preferred embodiment of the subject invention, the primary driving input 12 includes, the first bevel gear 18, the second bevel gear 20, and the intermediate output shaft 32.

Continuing, a first planetary gear system 36 is in driving engagement with the first output shaft 14 for rotating the first output shaft 14. The first planetary gear system 36 includes a first sun gear 40 driven by the primary driving input 12, a first plurality of planet gears 42 in meshing engagement about the first sun gear 40, and a first ring gear 44 disposed about and in meshing engagement with the first plurality of planet gears 42. Similarly, a second planetary gear system 38 is in driving engagement with the second output shaft 16 for rotating the second output shaft 16. As with the first planetary gear system 36, the second planetary gear system 38 includes a second sun gear 46 driven by the primary driving input 12, a second plurality of planet gears 48 in meshing engagement about the second sun gear 46, and a second ring gear 50 disposed about and in meshing engagement with the second plurality of planet gears 48.

Generally, the primary driving input 12 is in driving engagement with the first 36 and second 38 planetary gear systems to rotate the planetary gear systems 36, 38 in unison. The first 36 and second 38 planetary gear systems are disposed at the distal ends 34 of the intermediate output shaft 32 and rotate in unison with the intermediate output shaft 32 in response to being driven by the second bevel gear 20 of the primary driving input 12. More specifically, the first 40 and second 46 sun gears of the first 36 and second 38 planetary gear systems are disposed at the distal ends 34 of the intermediate output shaft 32. As a result, when the first 40 and second 46 sun gears rotate, the first 42 and second 48 plurality of planet gears rotate respectively around the first 40 and second 46 sun gears. Furthermore, the first 42 and second 48 plurality of planet gears rotate respectively within the first 44 and second 50 ring gears. The first 44 and second 50 ring gears are preferably stationary. As will be appreciated herein below, the first 44 and second 50 ring gears are not permanently stationary.

The apparatus 10 further includes at least one auxiliary input mechanism 52 in selective driving engagement with the first 36 and second 38 planetary gear systems for rotating the ring gears 44, 50 of the planetary gear systems 36, 38 in opposite directions to effect different rotational speeds to the first 14 and second 16 output shafts. Preferably, the auxiliary input mechanism 52 is an auxiliary bevel gear 54. As in the preferred embodiment of the subject invention, the at least one auxiliary input mechanism 52 is comprised of only a single gear interposed between and mechanically engaged to the first 36 and second 38 planetary gear systems for rotating the ring gears 44, 50 of the planetary gear systems 36, 38 in opposite directions to effect different rotational speeds to the first 14 and second 16 output shafts. More specifically, the bevel gear 54 meshes with the first 44 and second 50 ring gears of the first 36 and second 38 planetary gear systems for preventing rotation of the ring gears 44, 50 in a first mode and for rotating the ring gears 44, 50 at various speeds in a second mode. As appreciated, the auxiliary input mechanism 52 is in continuous engagement with the first 44 and second 50 ring gears and selectively drives ring gears 44, 50 only when it is desirable to effect different rotation speeds to the first 14 and second 16 output shafts.

In the first mode, differential rotation of the output shafts 14, 16, and therefore the ring gears 44, 50, is not desirable. For instance, differential rotation of the output shafts 14, 16 is not necessary when the vehicle is moving in a direct forward or a direct reverse direction. As a result, the single auxiliary input mechanism 54 is not activated in the first mode, the ring gears 44, 50 remain stationary, and the output shafts 14, 16 rotate at the same speed.

In the second mode, differential rotation of the output shafts 14, 16, and therefore the ring gears 44, 50, is desirable. For instance, differential rotation of the output shafts 14, 16 is desirable when the vehicle is required to manipulate a turn. As a result, the single auxiliary input mechanism 54 is activated (represented in FIG. 1 at A) in the second mode to rotate the first ring gear 44 in a first rotational direction, and the second ring gear 50 in an opposite rotational direction. The opposite relative rotation of the first 44 and second 50 ring gears causes the planet gear systems 42, 48 to rotate at different rotational speeds. Correspondingly, the first 14 and second 16 output shafts also rotate at different rotational speeds, and the vehicle can optimally manipulate a turn.

Figure 2:
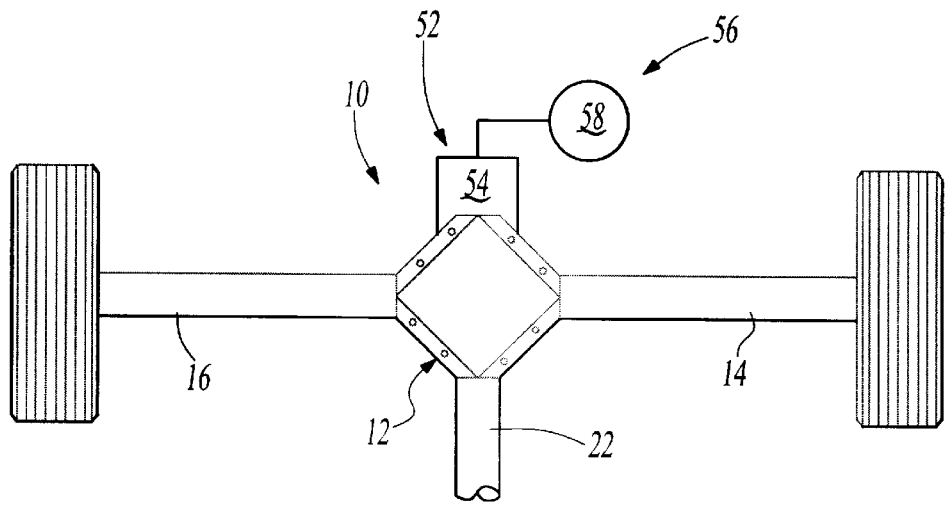
FIG. 2 is a partially cross-sectional top view showing in particular the auxiliary input mechanism at an inboard position functioning with a single control mechanism.

Referring primarily to FIG. 2, where the planetary gear systems 36, 38 and the auxiliary input mechanism 52 are shown at an inboard position of the vehicle, the apparatus 10 additionally includes at least one control mechanism 56 for controlling the single auxiliary input mechanism 54 between the first and second modes whereby the first 44 and second 50 ring gears may be rotated at any one of various speeds in the second mode to control the difference in rotational speed of the first 14 and second 16 output shafts. In practice, the control mechanism 56 controls the auxiliary input mechanism 52 between the first and second modes in response to various input information. As appreciated, such input information includes vehicle speed input, turning radius input, and other input information necessary to effect a proper turn of the vehicle. In the preferred embodiment of the subject invention, the at least one control mechanism 56 is comprised of only a single control mechanism 58 for controlling the single auxiliary input mechanism 54 between the first and second modes.

Figure 3A:
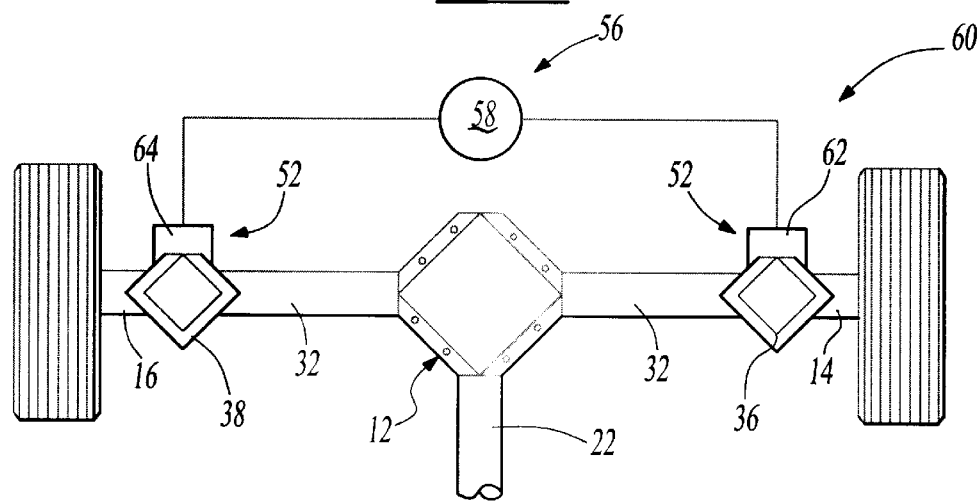
FIG. 3A is a partially cross-sectional top view showing in particular a first and a second auxiliary input mechanism at outboard positions functioning with the single control mechanism.
Figure 3B:
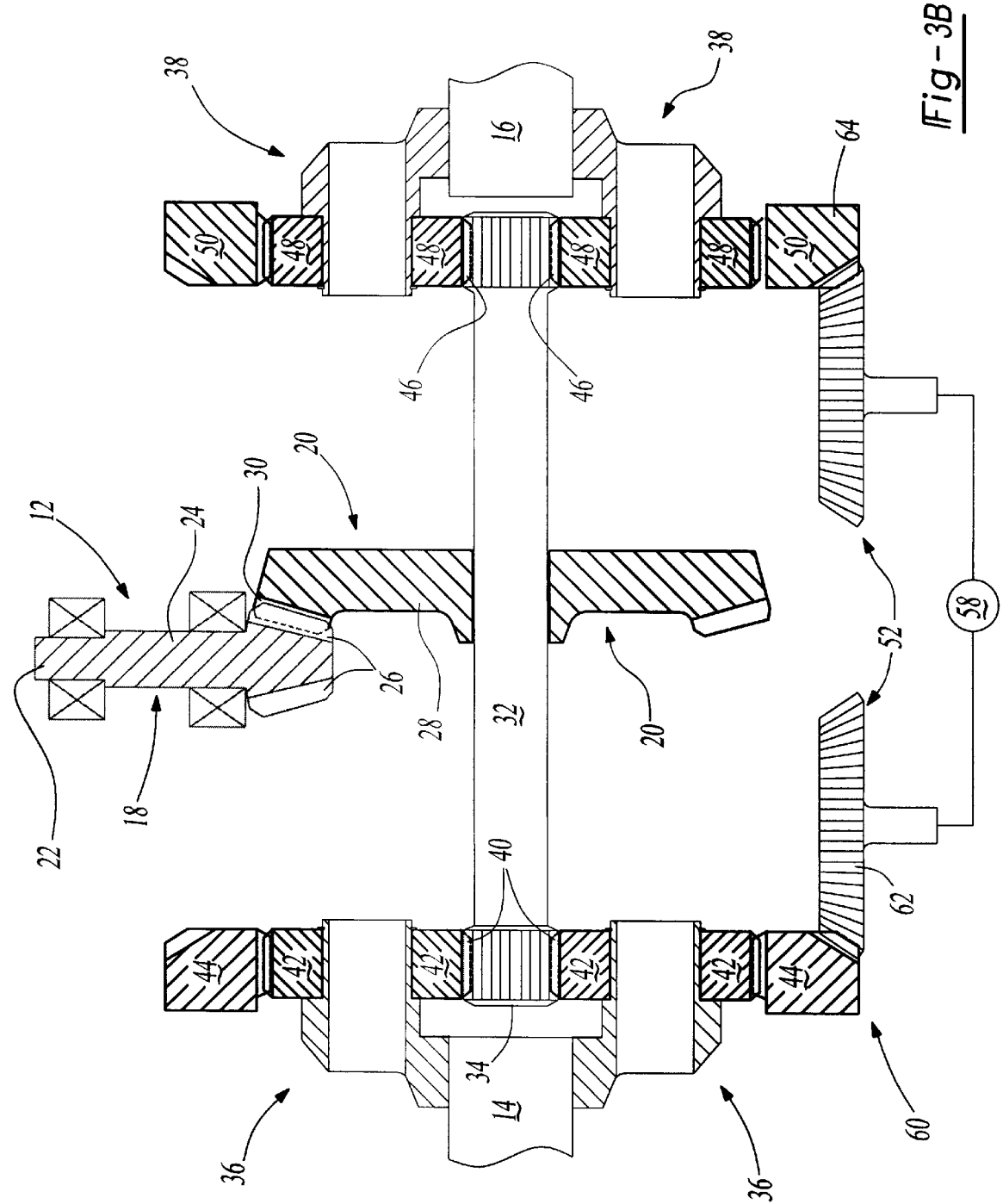
FIG. 3B is a detailed partially cross-sectional top view of the apparatus shown in FIG. 3A.

Referring now to FIGS. 3A and 3B, an alternative embodiment of the subject differential apparatus is shown at 60. In this embodiment, the at least one auxiliary input mechanism 52 specifically includes a first auxiliary input mechanism 62 and a second auxiliary input mechanism 64. As FIG. 3A generally shows, the planetary gear systems 36, 38 and the first 62 and second 64 auxiliary input mechanisms are at outboard positions of the vehicle. To accomplish this, the intermediate output shaft 32 is elongated in order to extend between the planetary gear systems 36, 38 that are positioned at the outboard positions of the vehicle.

Referring now to FIG. 3B, the first auxiliary input mechanism 62 is in selective driving engagement with the first planetary gear system 36 for rotating the first planetary gear system 36, and the second auxiliary input mechanism 64 is in selective driving engagement with the second planetary gear system 38 for rotating the second planetary gear system 38 in the opposite direction of the first planetary gear system 36 to effect different rotational speeds to the first 14 and second 16 output shafts. More specifically, the first auxiliary input mechanism 62 meshes with the first ring gear 44 of the first planetary gear system 36 for preventing rotation of the first ring gear 44 in a first mode and for rotating the first ring gear 44 at various speeds in a second mode, and the second auxiliary input mechanism 64 meshes with the second ring gear 50 of the second planetary gear system 38 for preventing rotation of the second ring gear 50 in the first mode and for rotating the second ring gear 50 at various speeds in the second mode.

As in the earlier embodiment, the alternative embodiment in FIGS. 3A and 3B also includes at least one control mechanism 56 for controlling the first 62 and the second 64 auxiliary input mechanisms between the first and second modes whereby the first 44 and second 50 ring gears may be rotated at any one of various speeds in the second mode to control the difference in rotational speed of the first 14 and second 16 output shafts. More specifically, the at least one control mechanism 56 is comprised of only a single control mechanism 58 for controlling the first 62 and the second 64 auxiliary input mechanisms between the first and second modes. As appreciated, the control purposes of the single control mechanism 58 in this alternative embodiment are the same as discussed above in the context of the primary embodiment.

Figure 4:
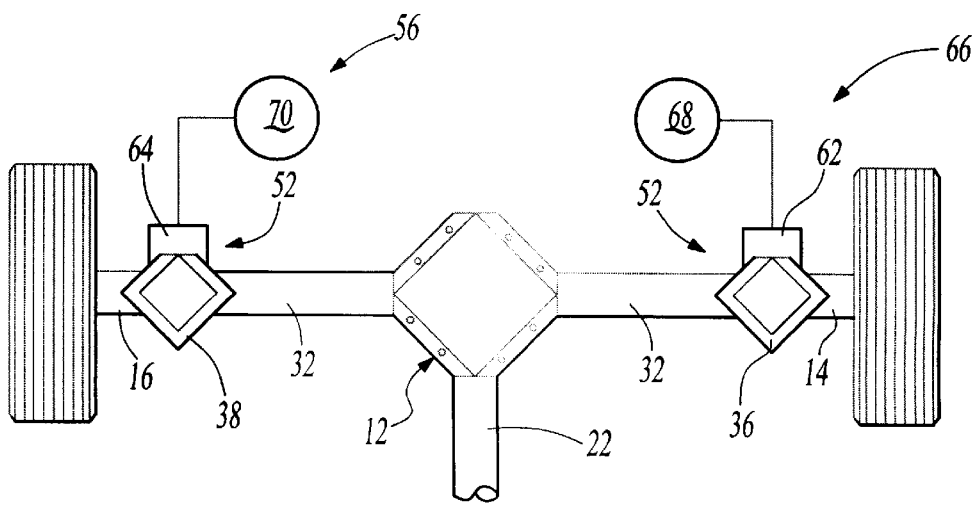
FIG. 4 is a partially cross-sectional top view showing in particular the first and second auxiliary input mechanisms at the outboard positions functioning with a first and second control mechanism.

Referring now to FIG. 4, an alternative embodiment of the subject differential apparatus is shown at 66. As with the embodiment disclosed in FIG. 3, the at least one auxiliary input mechanism 52 shown in FIG. 4 also specifically includes a first auxiliary input mechanism 62 and a second auxiliary input mechanism 64. Further, the planetary gear systems 36, 38 and the first 62 and second 64 auxiliary input mechanisms are at the same outboard position of the vehicle. As appreciated, the operation of the first 62 and second 64 auxiliary input mechanisms is identical to the operation of the mechanisms 62, 64 discussed above in the context of FIGS. 3A and 3B.

The alternative embodiment in FIG. 4 also includes at least one control mechanism 56 for controlling the first 62 and said second 64 auxiliary input mechanisms between the first and second modes whereby the first 44 and second 50 ring gears may be rotated at any one of various speeds in the second mode to control the difference in rotational speed of the first 14 and 16 second output shafts. More specifically, the control mechanism 56 includes a first control mechanism 68 and a second control mechanism 70, the first control mechanism 68 adapted for controlling the first auxiliary input mechanism 62 to rotate the first planetary gear system 36, and the second control mechanism 70 adapted for controlling the second auxiliary input mechanism 64 to rotate the second planetary gear system 38. As appreciated, the first 68 and second 70 control mechanisms are responsive to the same input information to effect a proper turn of the vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A differential apparatus for controlling the wheel speed of a vehicle, said apparatus comprising:

a primary driving input;

first and second output shafts;

a first planetary gear system in driving engagement with said first output shaft for rotating said first output shaft;

a second planetary gear system in driving engagement with said second output shaft for rotating said second output shaft;

at least one auxiliary input mechanism in selective driving engagement with said first and second planetary gear systems; and a controller receiving sensed vehicle information and sending a command to said auxiliary input mechanism in response thereto for rotating said planetary gear system differently relative to one another.

2. An apparatus as set forth in claim 1 wherein said first planetary gear system includes a first sun gear driven by said primary driving input, a first plurality of planet gears in meshing engagement about said first sun gear, and a first ring gear disposed about and in meshing engagement with said first plurality of planet gears.

3. An apparatus as set forth in claim 2 wherein said second planetary gear system includes a second sun gear driven by said primary driving input, a second plurality of planet gears in meshing engagement about said second sun gear, and a second ring gear disposed about and in meshing engagement with said second plurality of planet gears.

4. An apparatus as set forth in claim 3 wherein said primary driving input is in driving engagement with said first and second sun gears to rotate said sun gears in unison.

5. An apparatus as set forth in claim 1 wherein said at least one auxiliary input mechanism is comprised of only a single auxiliary input mechanism interposed between and mechanically engaged to said first and second planetary gear systems for rotating said planetary gear systems in opposite directions to effect different rotational speeds to said first and second output shafts.

6. An apparatus as set forth in claim 5 wherein said single auxiliary input mechanism meshes with ring gears associated with said first and second planetary gear systems for preventing rotation of said ring gears in a first mode and for rotating said ring gears at various speeds in a second mode.

7. An apparatus as set forth in claim 6 further including at least one control mechanism for controlling said single auxiliary input mechanism between said first and second modes whereby said ring gears may be rotated at any one of various speeds in said second mode to control the difference in rotational speed of said first and second output shafts.

8. An apparatus as set forth in claim 7 wherein said at least one control mechanism is comprised of only a single control mechanism for controlling said single auxiliary input mechanism between said first and second modes.

9. An apparatus as set forth in claim 1 wherein said primary driving input includes a first bevel gear and a second bevel gear, said first bevel gear in meshing engagement with said second bevel gear for rotatably driving said first and second output shafts.

10. An apparatus as set forth in claim 9 wherein said first bevel gear is mounted to a drive shaft of the vehicle, said first bevel gear is adapted to be driven in response to said drive shaft.

11. An apparatus as set forth in claim 1 wherein said primary driving input further includes an intermediate output shaft having distal ends, said intermediate output shaft disposed between said first and second output shafts and driven by said primary driving input.

12. An apparatus as set forth in claim 11 wherein said first and second planetary gear systems are disposed at said distal ends of said intermediate output shaft and rotate in unison with said intermediate output shaft in response to being driven by said primary driving input.

13. An apparatus as set forth in claim 1 wherein said at least one auxiliary input mechanism includes a first auxiliary input mechanism and a second auxiliary input mechanism, said first auxiliary input mechanism in selective driving engagement with said first planetary gear system for rotating said first planetary gear system, and said second auxiliary input mechanism in selective driving engagement with said second planetary gear system for rotating said second planetary gear system in the opposite direction of said first planetary gear system to effect different rotational speeds to said first and second output shafts.

14. An apparatus as set forth in claim 13 wherein said first auxiliary input mechanism meshes with a first ring gear associated with said first planetary gear system for preventing rotation of said first ring gear in a first mode and for rotating said first ring gear at various speeds in a second mode, and said second auxiliary input mechanism meshes with a second ring gear associated with said second planetary gear system for preventing rotation of said second ring gear in said first mode and for rotating said second ring gear at various speeds in said second mode.

15. An apparatus as set forth in claim 14 further including at least one control mechanism for controlling said first and said second auxiliary input mechanisms between said first and second modes whereby said first and second ring gears may be rotated at any one of various speeds in said second mode to control the difference in rotational speed of said first and second output shafts.

16. An apparatus as set forth in claim 15 wherein said at least one control mechanism is comprised of only a single control mechanism for controlling said first and said second auxiliary input mechanism between said first and second modes.

17. An apparatus as set forth in claim 15 wherein said at least one control mechanism includes a first control mechanism and a second control mechanism, said first control mechanism adapted for controlling said first auxiliary input mechanism to rotate said first planetary gear system, and said second control mechanism adapted for controlling said second auxiliary input mechanism to rotate said second planetary gear system.

18. An apparatus as set forth in claim 1 wherein said sensed vehicle information includes vehicle speed.

19. An apparatus as set forth in claim 1 wherein said sensed vehicle information includes vehicle turning radius.

* * * * *